(12) United States Patent
Nam

(10) Patent No.: US 12,000,586 B2
(45) Date of Patent: Jun. 4, 2024

(54) CHEVRON VANE AND MOISTURE SEPARATOR INCLUDING SAME

(71) Applicant: DOOSAN ENERBILITY CO., LTD, Changwon-si (KR)

(72) Inventor: Gyeong Mo Nam, Yongin-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 817 days.

(21) Appl. No.: 17/088,878

(22) Filed: Nov. 4, 2020

(65) Prior Publication Data

US 2021/0172596 A1 Jun. 10, 2021

(30) Foreign Application Priority Data

Dec. 10, 2019 (KR) ........................ 10-2019-0163913

(51) Int. Cl.
| | |
|---|---|
| F22B 37/30 | (2006.01) |
| F22B 37/26 | (2006.01) |
| B01D 45/06 | (2006.01) |
| B01D 45/08 | (2006.01) |
| B01D 45/10 | (2006.01) |
| B01D 45/12 | (2006.01) |
| F24F 13/14 | (2006.01) |
| F28C 1/16 | (2006.01) |

(52) U.S. Cl.
CPC .......... *F22B 37/306* (2013.01); *F22B 37/266* (2013.01); *B01D 45/06* (2013.01); *B01D 45/08* (2013.01); *B01D 45/10* (2013.01); *B01D 45/12* (2013.01); *F24F 13/1426* (2013.01); *F28C 1/16* (2013.01); *Y10S 55/37* (2013.01)

(58) Field of Classification Search
CPC .... F22B 37/306; F22B 37/266; F22B 37/268; B01D 45/06; B01D 45/08; B01D 45/10; B01D 45/12; F24F 13/1426; F28C 1/16; Y10S 55/37; Y02E 30/00; G21D 5/00
See application file for complete search history.

(56) References Cited

U.S. PATENT DOCUMENTS 2,066,832 A * 1/1937 Gay .......................... F24F 6/14
55/440
2,643,736 A * 6/1953 Smith .................... B01D 45/08
55/440

(Continued)

FOREIGN PATENT DOCUMENTS

| CN | 101818616 A | * | 9/2010 | ............... E06B 9/30 |
| CN | 103727588 A | * | 4/2014 | ............ F24F 1/0014 |

(Continued)

OTHER PUBLICATIONS

Epo translation of JP2012143710 (Year: 2012).*

*Primary Examiner* — Stephen Hobson
(74) *Attorney, Agent, or Firm* — Harvest IP Law, LLP

(57) ABSTRACT

Provided are a chevron vane that traps and removes droplets contained in steam and a moisture separator including the same. The chevron vane for trapping and removing droplets contained in steam includes a main frame group including multiple main frames arranged in a flow direction of steam and pivotably connected to each other, and a collection vane group mounted on the main frame group and including multiple collection vanes for trapping droplets contained in the steam.

16 Claims, 11 Drawing Sheets

(56) References Cited

U.S. PATENT DOCUMENTS

| | | | | |
|---|---|---|---|---|
| 3,517,486 A | * | 6/1970 | Golden | B01D 45/08 55/440 |
| 3,849,095 A | * | 11/1974 | Regehr | B01D 45/08 55/440 |
| 3,899,427 A | * | 8/1975 | Connelly | B01D 21/0075 55/440 |
| 3,912,471 A | * | 10/1975 | Cotton, Jr. | B01D 45/08 55/443 |
| 3,977,977 A | * | 8/1976 | Kall | B01D 21/0087 55/440 |
| 4,198,215 A | * | 4/1980 | Regehr | B01D 45/08 55/440 |
| 4,430,101 A | * | 2/1984 | Sixsmith | B01D 45/06 55/440 |
| 4,543,108 A | * | 9/1985 | Wurz | B01D 45/06 55/440 |
| 4,557,740 A | * | 12/1985 | Smith | B01D 45/06 55/440 |
| 4,802,901 A | * | 2/1989 | Wurz | B01D 45/06 55/440 |
| 5,019,300 A | * | 5/1991 | Davis | F28C 1/06 261/DIG. 11 |
| 5,104,431 A | * | 4/1992 | Fewel, Jr. | B01D 45/08 55/440 |
| 5,268,011 A | * | 12/1993 | Wurz | B01D 45/08 55/440 |
| 5,514,193 A | * | 5/1996 | Schaal | F24F 6/14 55/440 |
| 6,083,302 A | * | 7/2000 | Bauver, II | B01D 53/504 55/440 |
| 6,852,146 B2 | * | 2/2005 | Holmes | B01D 45/08 55/440 |
| 8,444,732 B2 | * | 5/2013 | Bratton | B01D 45/08 55/443 |
| 9,393,510 B2 | * | 7/2016 | MacDonald | B01D 45/12 |
| 10,179,305 B2 | * | 1/2019 | Valsler | B01D 45/16 |
| 10,272,376 B2 | * | 4/2019 | Samela | B01D 45/06 |
| 10,765,981 B2 | * | 9/2020 | Padovan | B01D 45/12 |
| 10,858,841 B1 | * | 12/2020 | Rockhold | F24F 13/18 |
| 2004/0007132 A1 | * | 1/2004 | Holmes | B01D 45/08 55/440 |
| 2009/0101014 A1 | * | 4/2009 | Baseotto | F02M 35/088 55/440 |
| 2010/0071560 A1 | * | 3/2010 | Daniel | B01D 50/20 264/80 |
| 2010/0199619 A1 | * | 8/2010 | Buzanowski | B01D 45/06 55/443 |
| 2010/0326026 A1 | * | 12/2010 | Bratton | B01D 45/06 55/440 |
| 2023/0229271 A1 | * | 7/2023 | Jeong | H10K 59/40 345/173 |

FOREIGN PATENT DOCUMENTS

| | | | |
|---|---|---|---|
| CN | 204768153 U | * | 11/2015 |
| CN | 205025583 U | * | 2/2016 |
| CN | 205025584 U | * | 2/2016 |
| CN | 106823575 A | * | 6/2017 |
| CN | 106955533 A | * | 7/2017 |
| CN | 206304544 U | * | 7/2017 |
| CN | 206715501 U | * | 12/2017 |
| CN | 206715502 U | * | 12/2017 |
| JP | 1995031816 A | | 2/1995 |
| JP | 2012143710 | * | 8/2012 |
| JP | 2012143710 A | | 8/2012 |
| KR | 1020130103543 A | | 9/2013 |
| KR | 101965329 B1 | | 3/2019 |
| KR | 1965329 B1 | * | 4/2019 ............ B01D 17/00 |
| WO | WO-0100299 A1 | * | 1/2001 ............ B01D 45/08 |

* cited by examiner

CHEVRON VANE AND MOISTURE SEPARATOR INCLUDING SAME

CROSS REFERENCE TO RELATED APPLICATION

This application claims priority to Korean Patent Application No. 10-2019-0163913, filed on Dec. 10, 2019, the entire disclosure of which is incorporated herein by reference in its entirety.

BACKGROUND

1. Field

Apparatuses and methods consistent with exemplary embodiments relate to a chevron vane and a moisture separator including the same, and more particularly to a chevron vane for trapping and removing droplets contained in steam and a moisture separator including the same.

2. Description of the Related Art

In order to improve a quality of steam introduced into a turbine of a nuclear power plant, a moisture separator is provided between a high pressure turbine and a low pressure turbine. The moisture separator includes a shell defining an internal space and having an input port through which steam passing through the high pressure turbine flows into the internal space of the shell. A chevron vane is built in the shell so that droplets contained in steam can be removed. In addition, a pair of reheaters, each being composed of a bundle of heat-transfer pipes, is disposed between the chevron vane and an output port through which the steam is discharged. The reheaters dry and heat the steam passing by, thereby improving the quality of the steam, resulting in an increase in power generation efficiency of the low-pressure turbine.

Related art moisture separators have a limitation that a shape of the chevron vane is fixed. Therefore, related art moisture separators are problematic in that an amount of trapped droplets cannot be adaptively controlled according to operating conditions of devices in which the chevron vanes are installed, and the pressure loss of steam cannot be dynamically controlled according to situations.

SUMMARY

Aspects of one or more exemplary embodiments provide a chevron vane capable of adjusting the pressure loss of steam and the collection efficiency of droplets according to operating conditions of a device and external parameters, and a moisture separator including the same.

Additional aspects will be set forth in part in the description which follows and, in part, will become apparent from the description, or may be learned by practice of the exemplary embodiments.

According to an aspect of an exemplary embodiment, there is provided a chevron vane for trapping and removing droplets contained in steam, the chevron vane including: a main frame group including multiple main frames arranged in a flow direction of steam and pivotably connected to each other; and a collection vane group mounted on the main frame group and including multiple collection vanes for trapping droplets contained in steam.

According to an aspect of another exemplary embodiment, there is provided a moisture separator through which steam passes to enter a turbine of a nuclear power plant, the moisture separator including: a shell including an input port for steam; a chevron vane installed in the shell, configured to pass the steam introduced through the input port, and configured to trap and remove droplets contained in the introduced steam; and a reheater installed behind the chevron vane and configured to heat the steam passing through the chevron vane. The chevron vane may include a main frame group including multiple main frames arranged in a flow direction of steam and pivotably connected to each other, and a collection vane group mounted on the main frame group and including multiple collection vanes for trapping droplets contained in the steam.

The main frame group may further include multiple hinge members, each hinge member connecting adjacent main frames.

Each collection vane may be mounted on one side surface of left and right side surfaces of a corresponding one of the main frame with respect to the flow direction of steam.

Each collection vane may be mounted on one side surface of a corresponding one of the main frames, and an upstream end of the collection vane in the flow direction of steam is bent toward the main frame.

The chevron vane may further include an auxiliary vane group disposed on an opposite side of the collection vane group with the main frame group disposed therebetween, and the auxiliary vane group may trap droplets contained in the steam flowing through the chevron vane.

The auxiliary vane group may include: a first auxiliary vane including an end pivotably connected to one main frame of the main frames; and a second auxiliary vane including a first end connected to another main frame adjacent to the first auxiliary vane and a second end pivotably connected to the first auxiliary vane.

Among the second auxiliary vanes, two second auxiliary vanes may be connected to one of the main frames at positions spaced apart from each other in a side-to-side direction of the main frame.

Each collection vane may be mounted on a side surface of a corresponding one of the main frames, and a downstream end of the collection vane in the flow direction of steam is bent outward.

The main frames may be connected to each other by the hinge members in such a manner that one main frame extends upstream from one hinge member and another main frame extends downstream from the hinge member. If both sides of each main frame of the multiple main frames with respect to the flow direction of steam are designated as a first side and a second side, respectively, each collection vane is mounted on only the first side of a corresponding one of the main frames, and the main frame extending downstream from the hinge member obliquely extends with respect to the flow direction of steam toward the second side on which the collection vane is not mounted.

If the main frame group includes a first main frame group and a second main frame group that are disposed in an upstream region and a downstream region with respect to the flow direction of the steam, respectively, an angle between each main frame belonging to the first main frame group is smaller than an angle between each main frame belonging to the second main frame group.

According to one or more exemplary embodiments, the chevron vane and the moisture separator including the same are configured such that the main frames of the main frame group are pivotably connected to each other by the hinge members. Therefore, an overall length of the chevron vane, a cross-sectional area of a flow path, and an angle between each main frame are adaptively adjusted according to operating conditions. This makes it possible to adaptively adjust the pressure loss of steam and the collection efficiency of droplets according to the operating conditions and external parameters.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
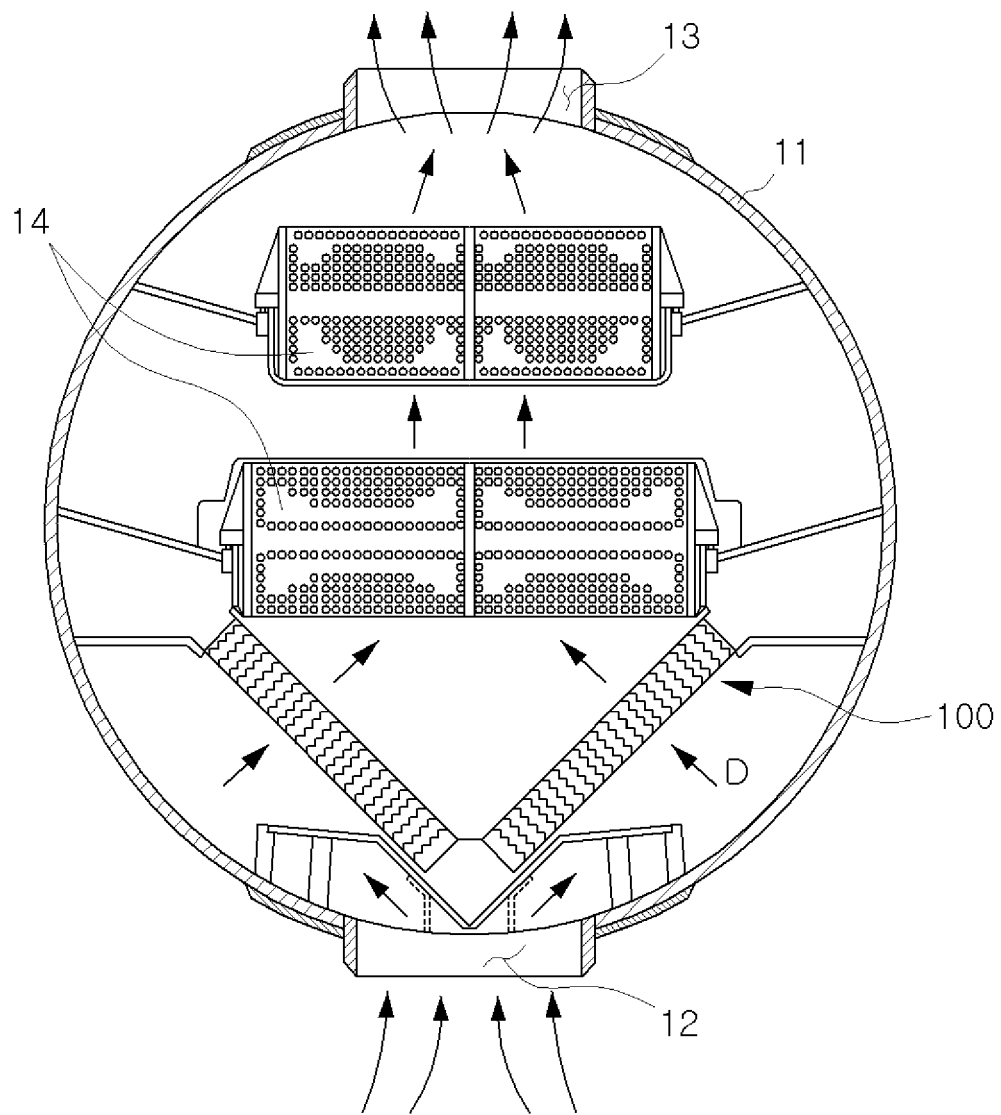
FIG. 1 is a view illustrating a moisture separator according to an exemplary embodiment.

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
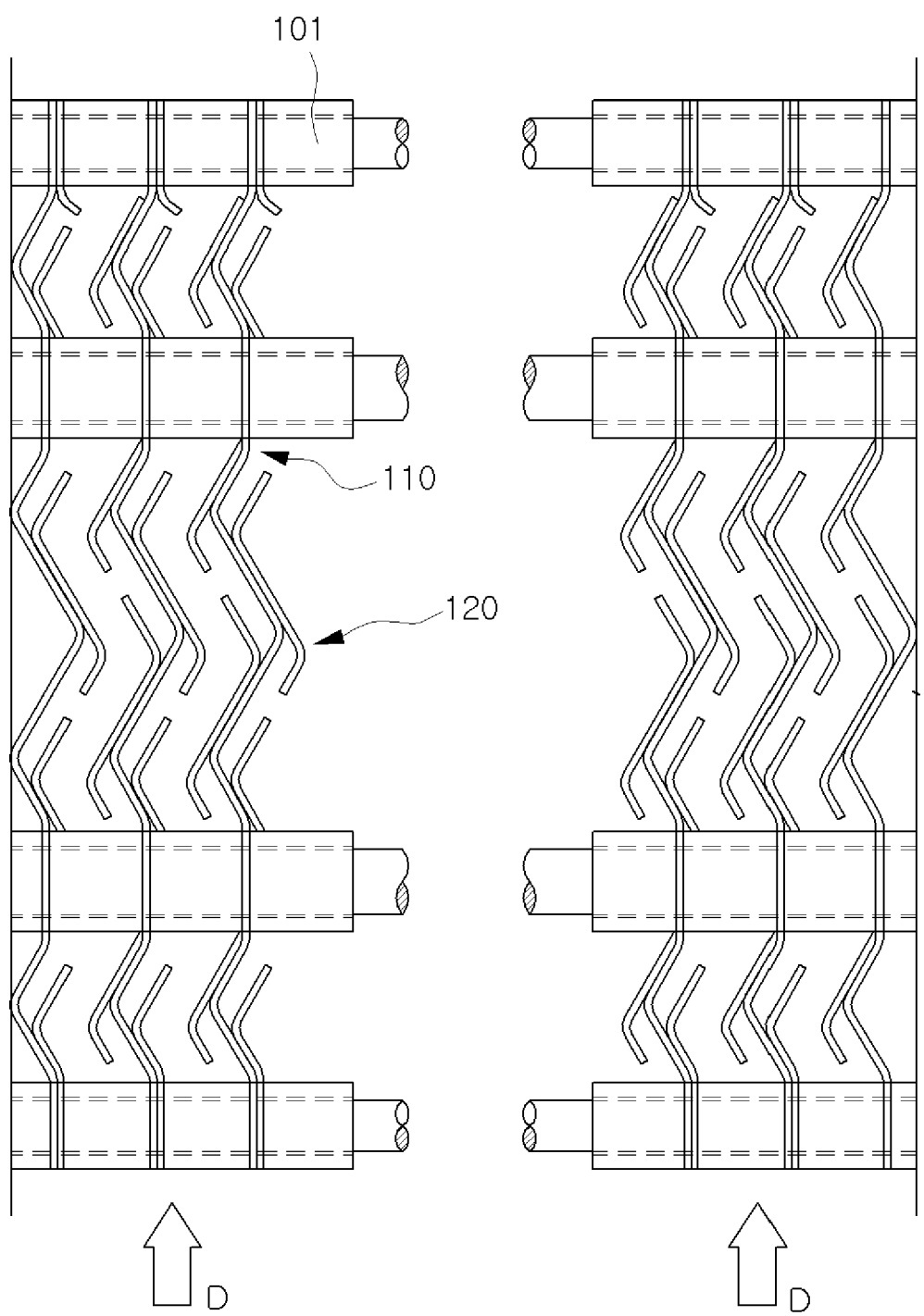
FIG. 2 is a view illustrating an internal structure of a chevron vane shown in FIG. 1.

FIG. 1 is a view illustrating a moisture separator according to an exemplary embodiment, and FIG. 2 is a view illustrating an internal structure of a chevron vane shown in FIG. 1.

Referring to FIG. 1, a moisture separator 10 according to an exemplary embodiment is installed in an inlet of a turbine of a nuclear power plant so that steam entering the turbine must pass through the moisture separator 10. The moisture separator 10 includes a shell 11, a chevron vane 100, and a reheater 14.

The shell 11 defines an internal flow path and has an input port 12 and an output port 13 through which steam is introduced and discharged. The chevron vane 100 is installed in the shell 11 and is positioned near the input port 12. The chevron vane 100 traps and removes droplets contained in steam introduced into the moisture separator 10 through the input port 12. The reheater 14 is installed behind the chevron vane 100 and heats the steam passing through the chevron vane 100.

Referring to FIG. 2, the chevron vane 100 includes a main shaft 101, a main frame group 110, and a collection vane group 120. In the chevron vane 100, the main shaft 101 is installed to extend from side to side. The main frame group 110 is anchored to the main shaft 101. The collection vane group 120 is attached to the main frame group 110 and traps droplets contained in steam flowing through the moisture separator.

Figure 3:
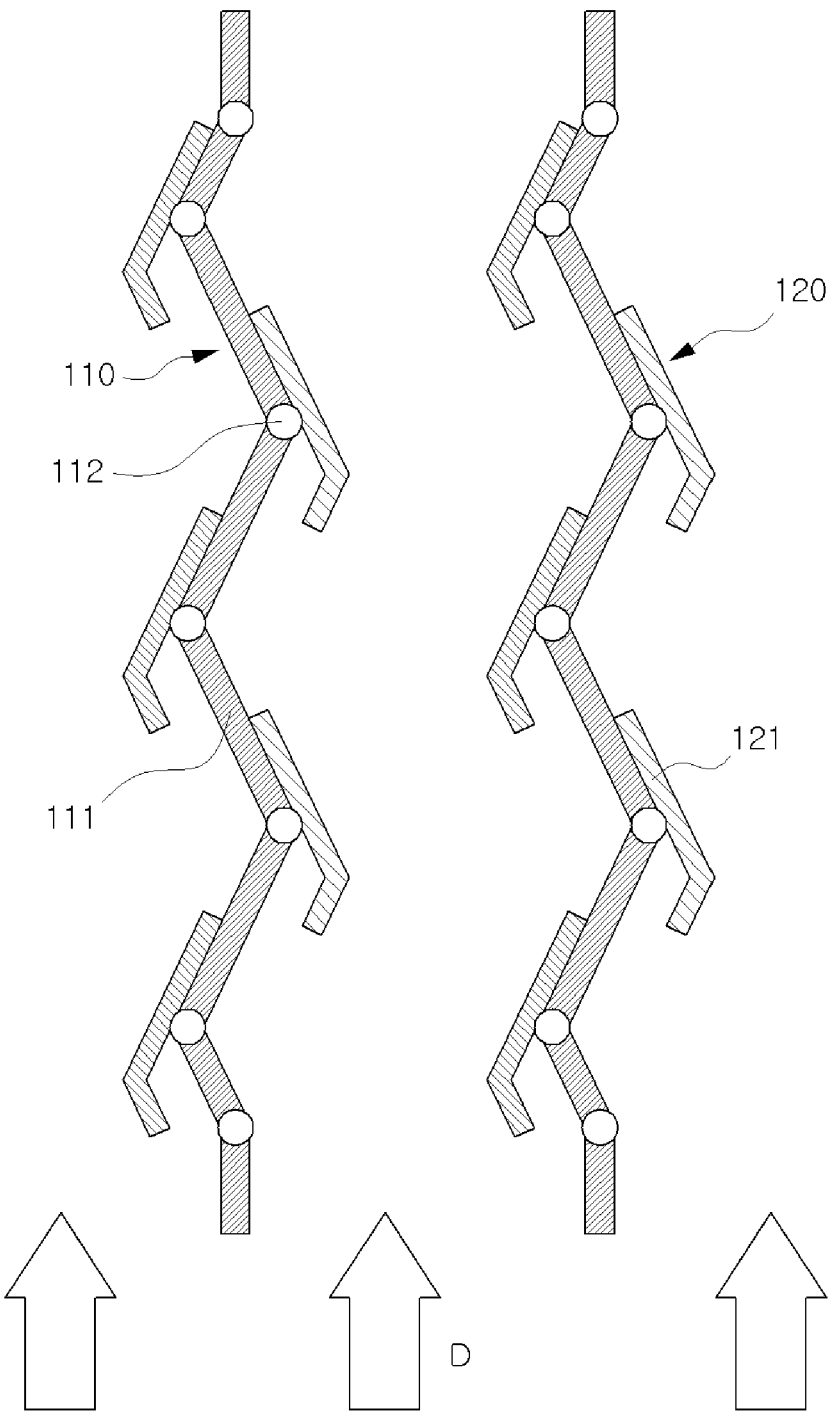
FIGS. 3 to 5 are views illustrating a chevron vane according to a first exemplary embodiment.
Figure 4:
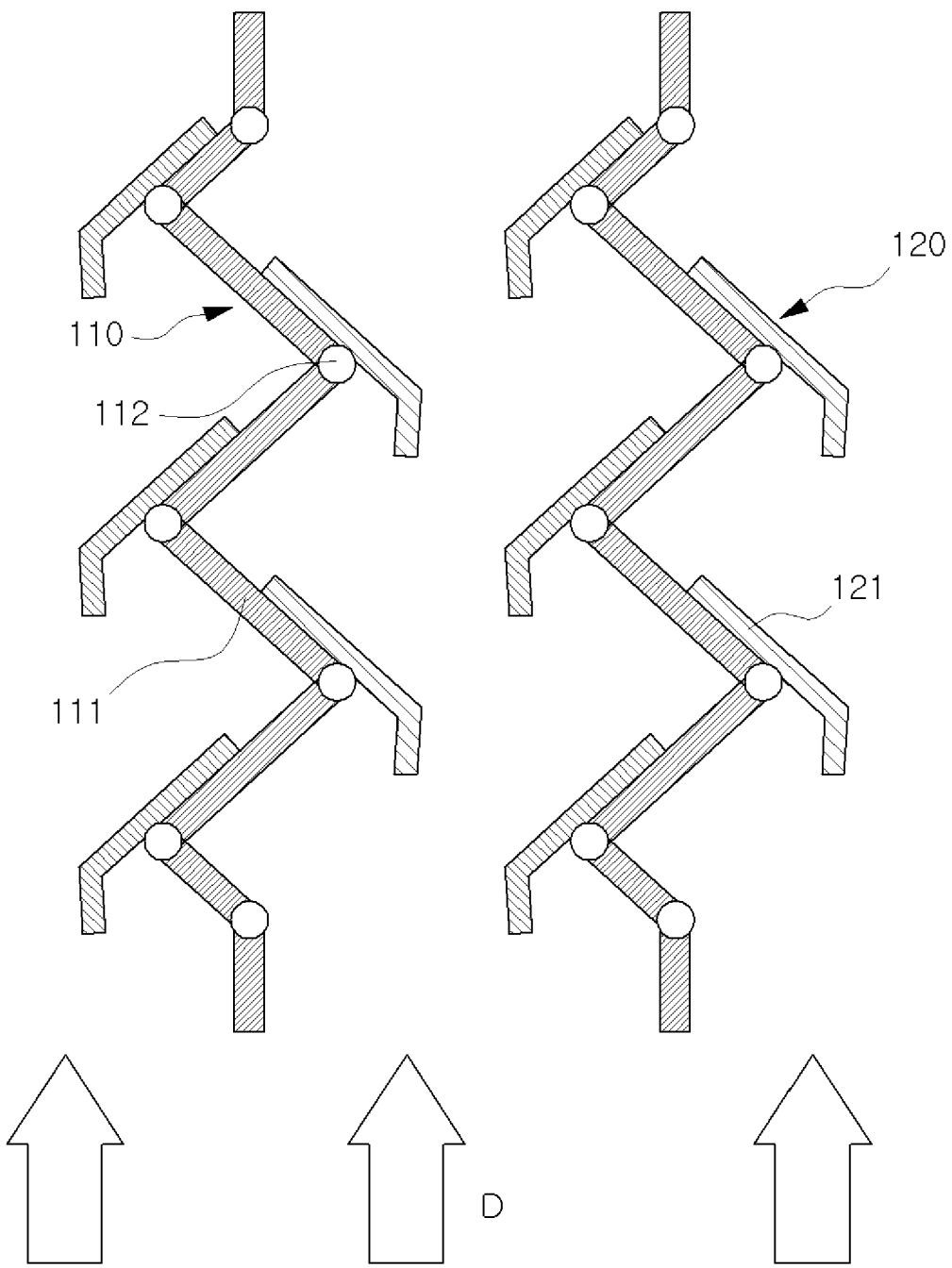
Figure 5:
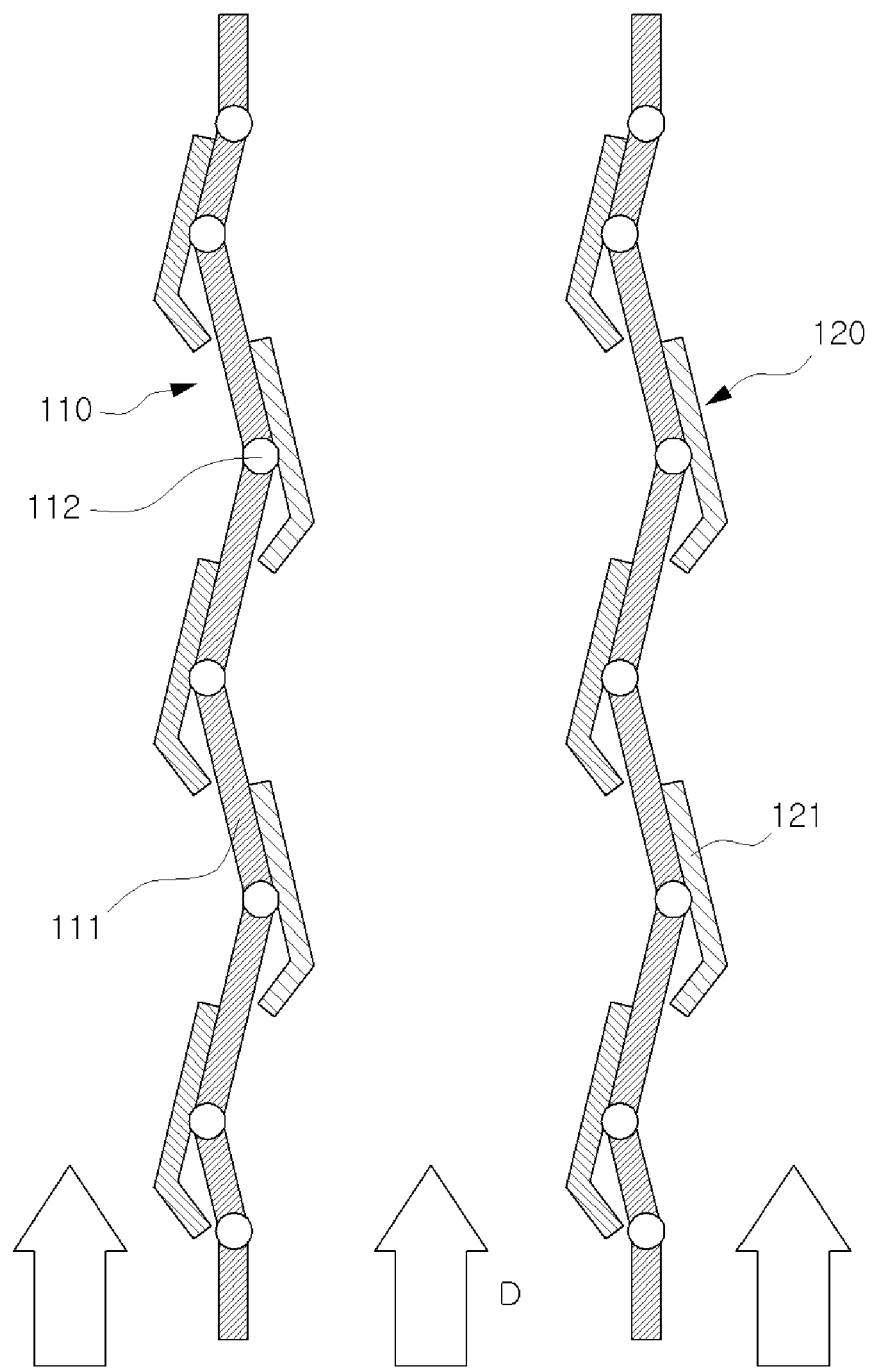
Figure 6:
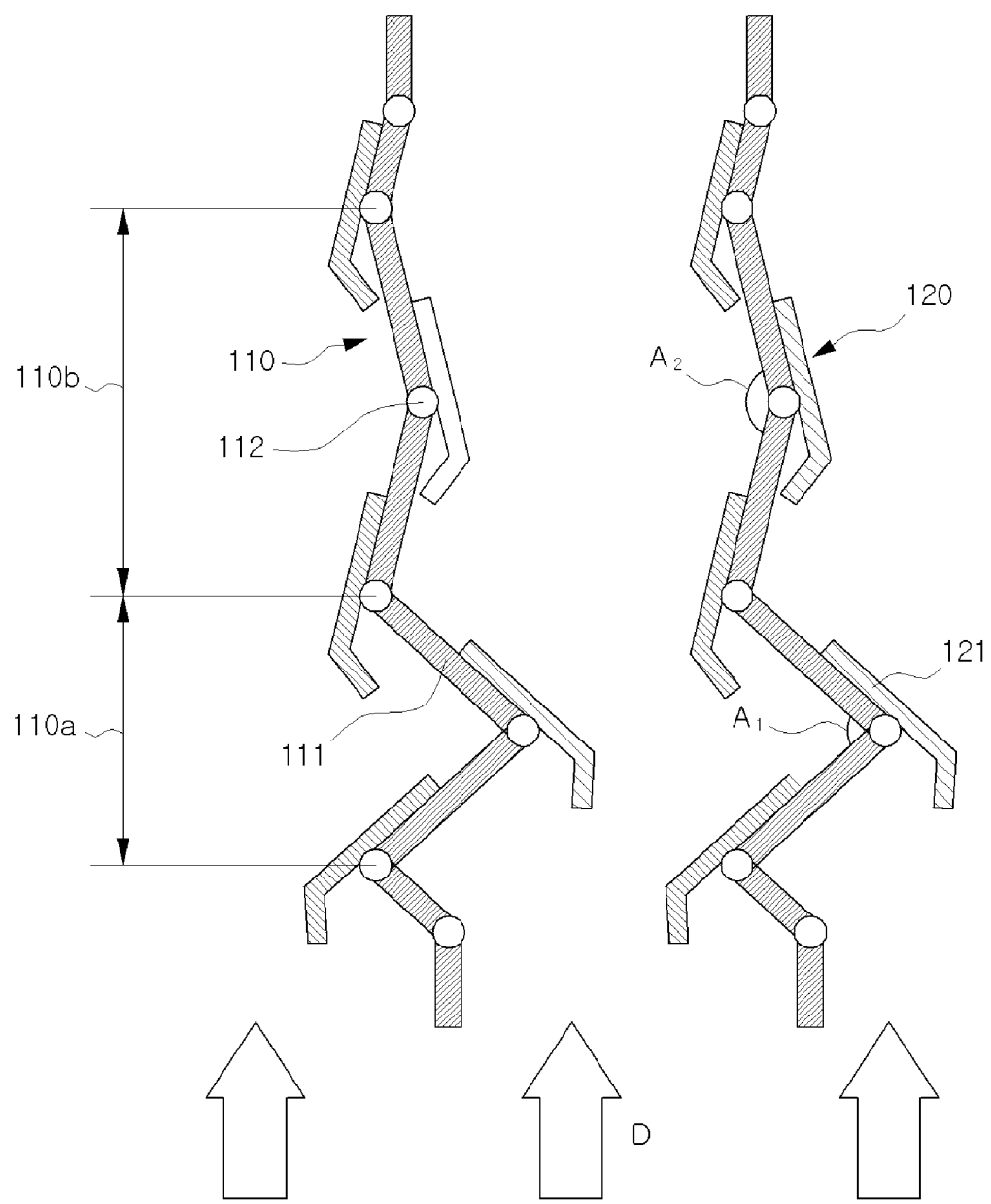
FIG. 6 is a view illustrating a first modification to the first exemplary embodiment, in which the chevron vanes illustrated in FIGS. 4 and 5 are combined.

Hereinafter, chevron vanes according to a first exemplary embodiment will be described. FIGS. 3 to 5 are views illustrating a chevron vane according to a first exemplary embodiment, and FIG. 6 is a view illustrating a first modification to the first exemplary embodiment, in which the chevron vanes illustrated in FIGS. 4 and 5 are combined.

Referring to FIGS. 3 to 5, in a chevron vane 100 according to a first exemplary embodiment, a main frame group 110 includes multiple main frames 111 and multiple hinge members 112. The multiple main frames 111 are arranged in a flow direction D of steam. Each hinge member 112 is disposed between two main frames 111 to pivotably connect the two main frames 111.

The collection vane group 120 includes multiple collection vanes 121. The multiple collection vanes 121 are attached to the multiple main frames 111, respectively. The collection vanes 121 collect droplets contained in steam passing by. Each collection vane 121 is installed only on one side surface of a corresponding one of the main frames 111 when viewed in the flow direction D. The multiple collection vanes 121 are alternately disposed on first and second sides (for example, the left and right sides) of the main frame group 110 when viewed in the flow direction D. Here, each collection vane 121 is formed such that an upstream end thereof in the flow direction D is bent toward a corresponding one of the main frames 111. Therefore, the collection vanes 121 can more effectively remove droplets contained in the steam flowing through a channel between the main frames 111.

The multiple main frames 111 are connected to each other by the hinge members 112 in such a manner that one main frame 111 extends upstream from one hinge member 112 and the other main frame 111 extends downstream from the same hinge member 112. That is, two main frames 111 of the multiple main frames and one hinge member 112 of the multiple hinge members 112 form a main frame set. In one main frame set, when both sides of a downstream main frame 111 with respect to the flow direction D are designated as a first side and a second side, respectively, the downstream main frame 111 extends obliquely toward the second side to which the collection vane is not mounted. That is, an arrangement of the multiple main frames 111 forms an overall zigzag pattern as illustrated in FIGS. 3 to 5. Each collection vane 121 connected to respective main frame 111 forms a trap to collect droplets between itself and one main frame 111 disposed on the upstream side of the collection vane 121.

According to the exemplary embodiment, because the chevron vane 100 is configured such that the multiple main frames 111 are pivotably connected to each other by the multiple hinge members 112 as illustrated in FIGS. 3 to 5, an overall length (i.e., length in the flow direction D) of the main frame group 110 can be adjusted, and a cross-sectional area of the flow path between the collection vane group 120 and the adjacent main frame group 110 can be changed. For example, when steam contains a lot of droplets, the structure of the chevron vane 100 is changed as illustrated in FIG. 4 to improve the collection efficiency of droplets while when steam contains a few droplets, the structure of the chevron vane 100 is changed as illustrated in FIG. 5 to reduce the pressure loss of the steam. That is, the chevron vane 100 according to the exemplary embodiment has advantages in that the overall length of the chevron vane, the cross-sectional area of the flow path of steam, and the angle between each of the main frames can be adaptively adjusted. Therefore, the pressure loss of steam and collection efficiency of droplets can be adaptively controlled according to the operating conditions of a device and external parameters.

Referring to FIGS. 4 and 5, an angle between each main frame 111 of the main frame group 110 is uniform along the flow direction D of steam, though it is understood that other embodiments are not limited thereto and other arrangements may be used. For example, in a chevron vane 100 illustrated in FIG. 6, an angle between each main frame 111 of the main frame group 110 is relatively small in a downstream region in the flow direction D as illustrated in FIG. 4 while the angle is relatively large in an upstream region as illustrated in FIG. 5.

Referring to FIG. 6, the multiple main frames 111 may include a first main frame group 110a and a second main frame group 110b that are disposed on the downstream side and the upstream side in the flow direction D of the steam, respectively. In this case, an angle A1 (i.e., acute angle) between each main frame 111 in the first main frame group 110a is smaller than an angle A2 (i.e., obtuse angle) between each main frame 111 in the second main frame group 110b. Each of the angle A1 and the angle A2 refers to an angle between two main frames provided on both sides of one hinge member 112 and is equal to or smaller than 180°.

In this case, a cross-sectional area of the flow path formed between the main frame groups 110 spaced apart from each other in a direction perpendicular to the flow direction D is smaller in the upstream region than in the downstream region. Generally, the steam in the upstream region contains more droplets and the steam in the downstream region contains fewer droplets. Accordingly, if the main frame group 110 is designed as shown in FIG. 6, the main frame group 110 in the upstream region can adsorb more droplets and the mainstream group 110 in the downstream region can reduce the pressure loss of steam. Therefore, with the chevron vane 100 illustrated in FIG. 6, the angle between each main frame 111 can be optimally adjusted locally according to operating conditions and situations.

Figure 7:
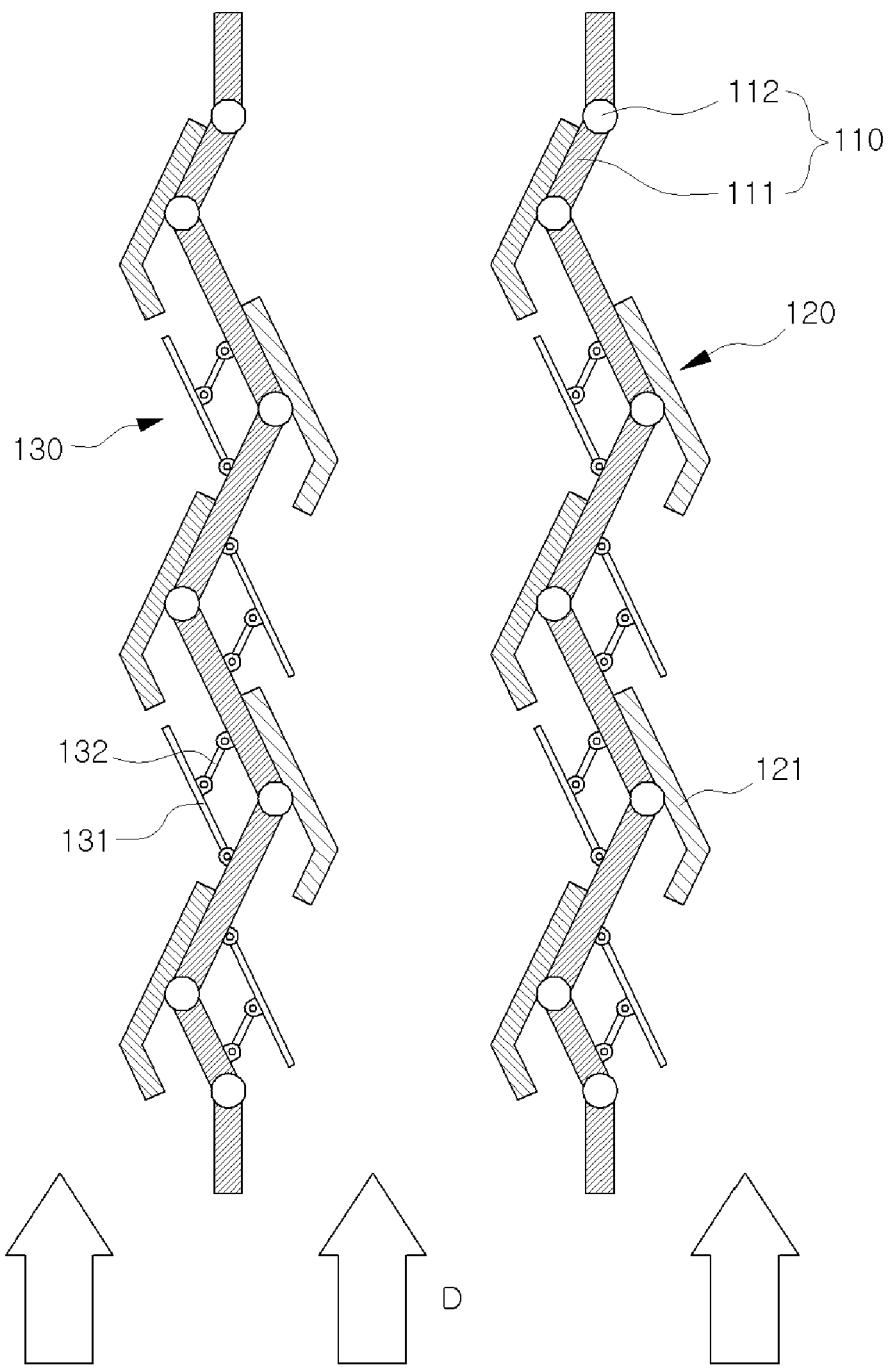
FIGS. 7 to 9 are views illustrating a chevron vane according to a second exemplary embodiment.
Figure 8:
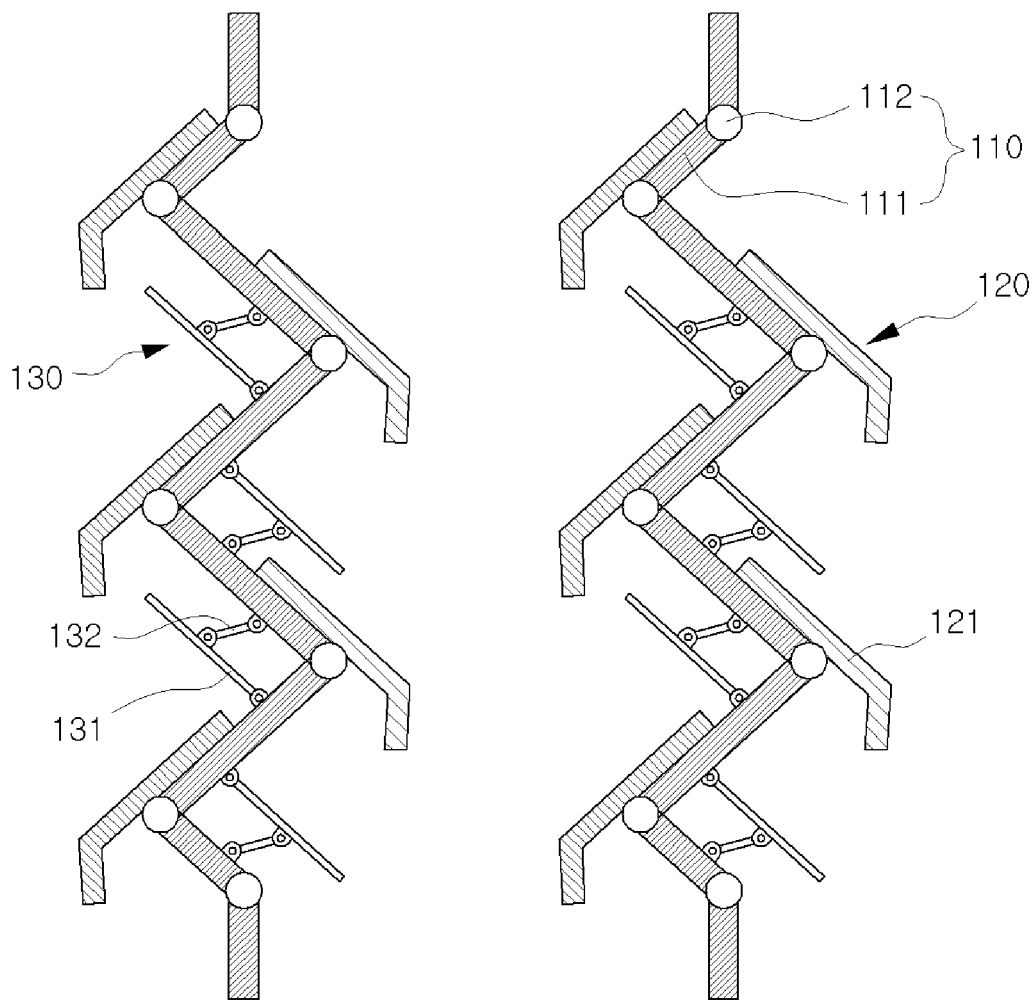
Figure 8:
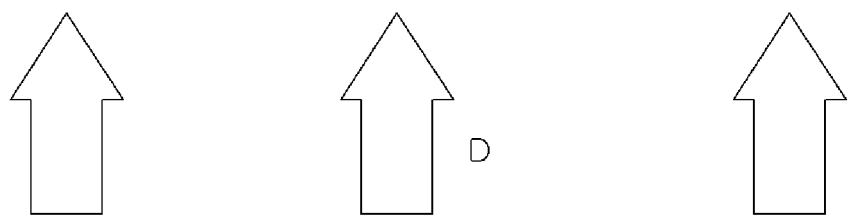
Figure 9:
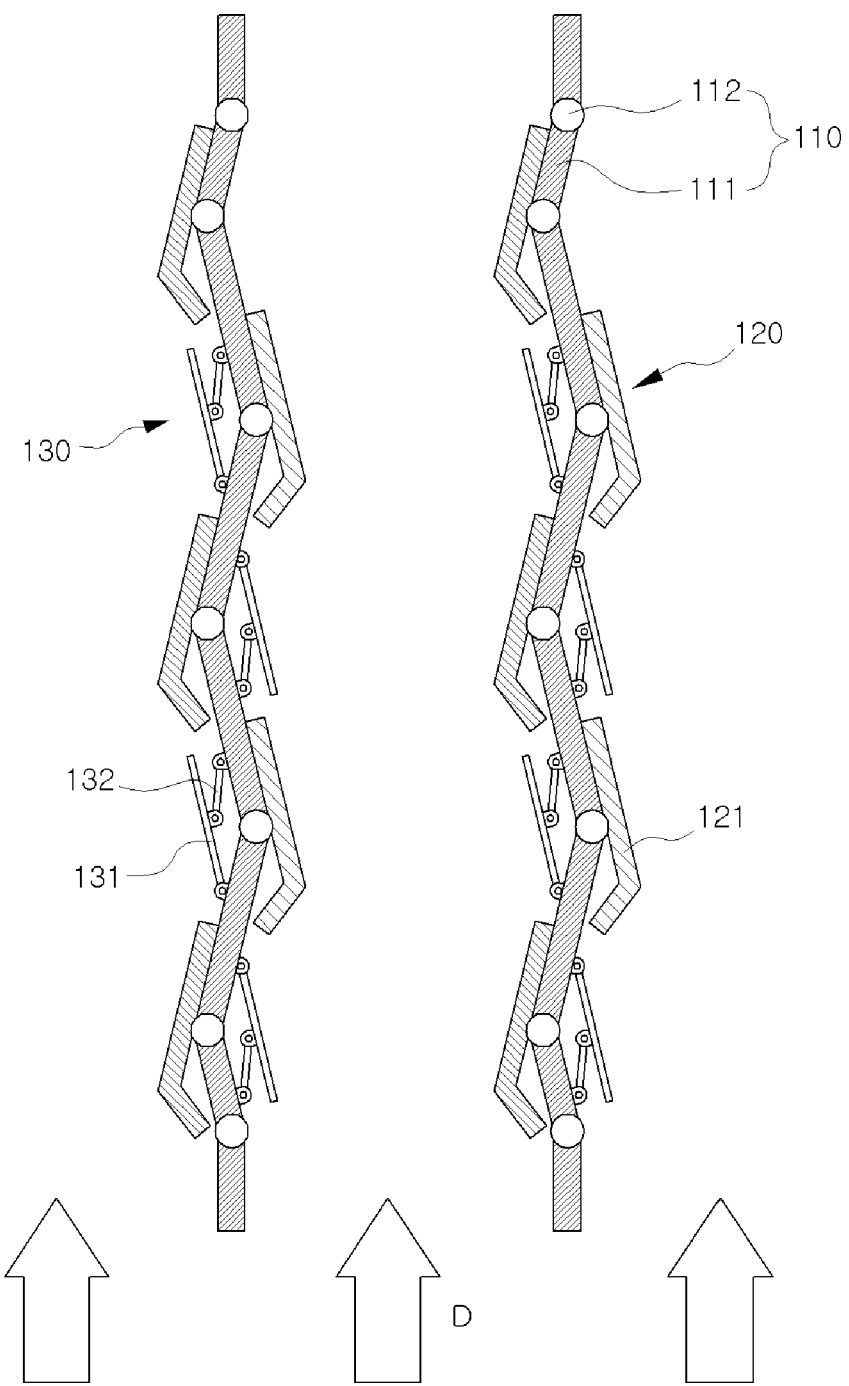
Figure 10:
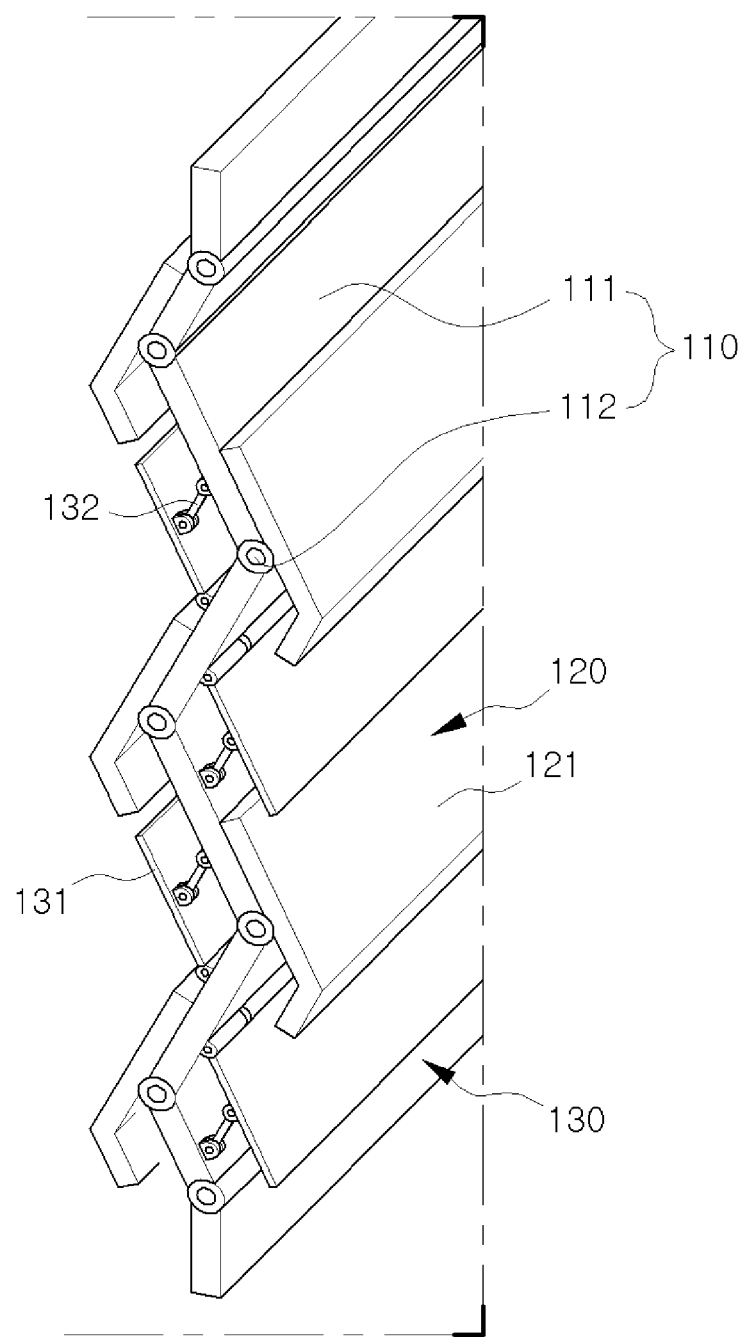
FIG. 10 is a perspective view illustrating a main frame group and an auxiliary vane group included in the chevron vane illustrated in FIG. 7.

Hereinafter, chevron vanes according to a second exemplary embodiment will be described. FIGS. 7 to 9 are views illustrating a chevron vane according to a second exemplary embodiment, and FIG. 10 is a perspective view illustrating a main frame group and an auxiliary vane group included in the chevron vane illustrated in FIG. 7. In describing the exemplary embodiments, only parts that differ from the first exemplary embodiment will be described.

Referring to FIGS. 7 to 10, a chevron vane 200 according to the second exemplary embodiment additionally includes an auxiliary vane group 130 compared to the first exemplary embodiment.

The auxiliary vane group 130 is installed on an opposite side of the collection vane group 120 with the main frame group 110 disposed therebetween. The auxiliary vane group 130 traps droplets contained in the steam flowing between adjacent main frame groups. The auxiliary vane group 130 includes first auxiliary vanes 131 and second auxiliary vanes 132.

The first auxiliary vane 131 has an end pivotably connected to one main frame 111 of the multiple main frames 111. The second auxiliary vane 132 has a first end pivotably connected to another main frame 111 adjacent to the first auxiliary vane 131 and a second end pivotably connected to the first auxiliary vane 131. In this case, every two second auxiliary vanes 132 of the auxiliary vane group form a pair. The pair of two second auxiliary vanes 132 are connected to one main frame 111 and spaced apart from each other in a side-to-side direction of the main frame 111. The auxiliary vane group 130 is configured such that droplets in the steam passing the auxiliary vane group 130 are trapped between the second auxiliary vane 132 and the corresponding main frame 111. Alternatively, the second auxiliary vane 132 may have a plate shape, and the second end of the second auxiliary vane 132 may be pivotably connected to the first auxiliary vane 131.

Figure 11:
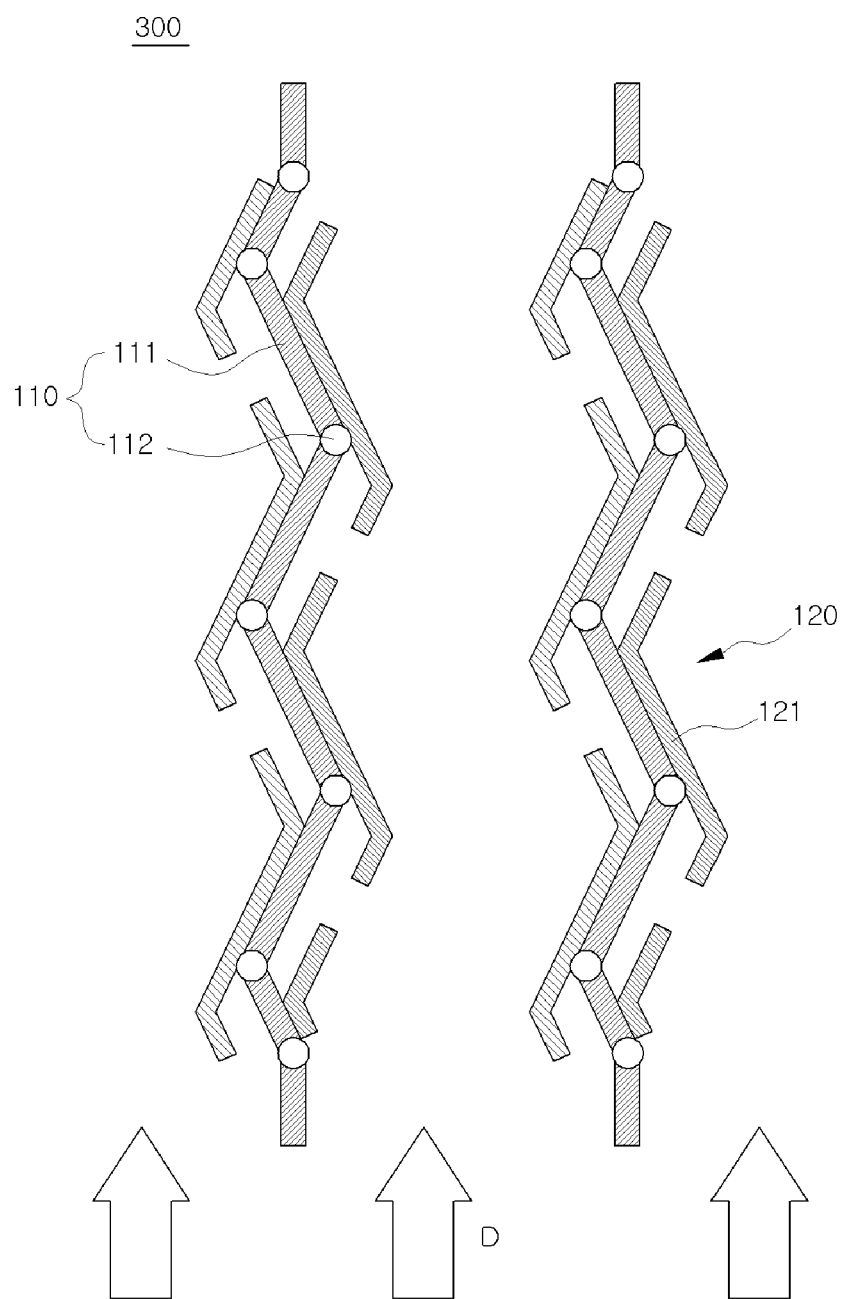
FIG. 11 is a view illustrating a chevron vane according to a third exemplary embodiment.

Hereinafter, a chevron vane 300 according to a third exemplary embodiment will be described with reference to FIG. 11. Referring to FIG. 11, each collection vane 121 is shaped such that a downstream end in the flow direction D thereof is bent outward. That is, the downstream end of the collection vane 121 is relatively far from the main frame 111 than the other portion of the collection vane 121. In this case, the droplets contained in the steam can be trapped by the upstream end of the collection vane group 121, and the steam is guided to an area between the downstream end of the collection vane group 120 and the adjacent main frame group 110 so that the droplets can also be trapped by the downstream end of the collection vane group 120.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A chevron vane for trapping and removing droplets contained in steam, the chevron vane comprising:
   a main frame group comprising multiple main frames arranged in a flow direction of steam and pivotably connected to each other, wherein the main frame group further comprises multiple hinge members, each hinge member connecting adjacent main frames;
   a collection vane group mounted on one side of the main frame group and comprising multiple collection vanes for trapping droplets contained in the steam; and
   an auxiliary vane group comprising multiple auxiliary vanes installed on and in contact with an opposite side of the main frame group such that the main frame group being disposed between the collection vane group and the auxiliary vane group, the auxiliary vane group functioning to trap droplets contained in the steam passing by,
   wherein one collection vane is located on one side of each hinge member and one auxiliary vane is located on the other side of the same hinge member.

2. The chevron vane according to claim 1, wherein each collection vane is mounted on one side surface of left and right side surfaces of a corresponding one of the main frames with respect to the flow direction of steam.

3. The chevron vane according to claim 1, wherein each collection vane is mounted on a side surface of a corresponding one of the main frames with respect to the flow direction of steam, and an upstream end of the collection vane in the flow direction of steam is bent toward the main frame.

4. The chevron vane according to claim 1, wherein the auxiliary vane group comprises: a first auxiliary vane including an end pivotably connected to one main frame of the main frames; and a second auxiliary vane including a first end connected to another main frame adjacent to the first auxiliary vane and a second end pivotably connected to the first auxiliary vane.

5. The chevron vane according to claim 4, wherein two of the second auxiliary vanes are connected to one of the main frames at positions spaced apart from each other in a side-to-side direction of the main frame.

6. The chevron vane according to claim 1, wherein each collection vane is mounted on a side surface of a corresponding one of the main frames with respect to the flow direction of steam, and a downstream end of the collection vane in the flow direction of steam is bent outward.

7. The chevron vane according to claim 1, wherein the main frames are connected to each other by the hinge members in such a maier that one main frame extends upstream from one hinge member and another main frame extends downstream from the hinge member, wherein if both sides of each main frame of the multiple main frames with respect to the flow direction of steam are designated as a first side and a second side, respectively, each collection vane is mounted on only the first side of a corresponding one of the main frames, and wherein the main frame extending downstream from the hinge member obliquely extends with respect to the flow direction of steam toward the second side on which the collection vane is not mounted.

8. The chevron vane according to claim 1, wherein if the main frame group includes a first main frame group and a second main frame group that are disposed in an upstream region and a downstream region with respect to the flow direction of the steam, respectively, an angle between adjacent main frames belonging to the first main frame group is smaller than an angle between adjacent main frames belonging to the second main frame group.

9. A moisture separator through which steam passes to enter a turbine of a nuclear power plant, the moisture separator comprising:
a shell including an input port for steam;
a chevron vane installed in the shell, configured to pass the steam introduced through the input port, and configured to trap and remove droplets contained in the introduced steam; and
a reheater installed behind the chevron vane and configured to heat the steam passing through the chevron vane,
wherein the chevron vane comprises:
a main frame group including multiple main frames arranged in a flow direction of the steam and pivotably connected to each other, wherein the main frame group further comprises multiple hinge members, each hinge member connecting adjacent main frames;
a collection vane group mounted on one side of the main frame group and including multiple collection vanes for trapping droplets contained in the steam; and
an auxiliary vane group comprising multiple auxiliary vanes installed on and in contact with an opposite side of the main frame group such that the main frame group being disposed between the collection vane group and the auxiliary vane group, the auxiliary vane group functioning to trap droplets contained in the steam passing by,
wherein one collection vane is located on one side of each hinge member and one auxiliary vane is located on the other side of the same hinge member.

10. The moisture separator according to claim 9, wherein each collection vane is mounted on one side surface of left and right side surfaces of a corresponding one of the main frames with respect to the flow direction of steam.

11. The moisture separator according to claim 9, wherein each collection vane is mounted on a side surface of a corresponding one of the main frames, and an upstream end of the collection vane in the flow direction of steam is bent toward the main frame.

12. The moisture separator according to claim 9, wherein the auxiliary vane group comprise a first auxiliary vane including one end pivotably connected to one of the main frames and a second auxiliary vane including a first end pivotably connected to another main frame adjacent to the first auxiliary vane and a second end pivotably connected to the first auxiliary vane.

13. The moisture separator according to claim 12, wherein two of the second auxiliary vanes are in a pair, and the two secondary auxiliary vanes in one pair are spaced apart from each other in a side-to-side direction of the main frame.

14. The moisture separator according to claim 9, wherein each collection vane is installed on a side surface of a corresponding one of the main frames, and a downstream end of each collection vane in the flow direction of steam is bent outward.

15. The moisture separator according to claim 9, wherein the main frames are connected to each other by the hinge members in such a manner that one main frame extends upstream from one hinge member and another main frame extends downstream from the same hinge member, wherein if both sides of each main frame of the multiple main frames with respect to the flow direction of steam are designated as a first side and a second side, respectively, each collection vane is mounted on only the first side of a corresponding one of the main frames, and wherein the main frame extending downstream from the hinge member obliquely extends with respect to the flow direction of steam toward the second side on which the collection vane is not mounted.

16. The moisture separator according to claim 9, wherein if the main frame group includes a first main frame group and a second main frame group disposed in an upstream region and a downstream region in the flow direction of the steam, respectively, an angle between adjacent main frames belonging to the first main frame group is smaller than an angle between adjacent main frames belonging to the second main frame group.

* * * * *